United States Patent Office

3,679,638
Patented July 25, 1972

---

3,679,638
PREPARING FINELY DIVIDED COPOLYAMIDES BY PRECIPITATION FROM ALCOHOL-WATER SOLUTION
Hans Helmuth Korsgen, Praroman-Le Mouret, and Wolfgang Weller, Bulle, Switzerland, assignors to Coathylene S.A., Fribourg, Switzerland
No Drawing. Filed Apr. 8, 1970, Ser. No. 26,801
Claims priority, application Austria, Apr. 14, 1969,
A 3,591/69
Int. Cl. C08g 20/38
U.S. Cl. 260—78 S          16 Claims

ABSTRACT OF THE DISCLOSURE

Very finely divided powdered copolyamides, particularly ternary copolyamides melting between 100°–200° C., are prepared by first dissolving the copolyamide in a mixture of $C_1$–$C_5$ alcohol and water containing a dissolved ionizable salt as a precipitation aid, and thereafter removing the solvent as by evaporation.

PREAMBLE

Copolyamides, especially ternary copolyamides having adjustable melting temperatures between about 100° and 200° C. have recently gained considerable importance in the class of synthetic polyamides. These are, for example, ternary copolyamides of the type 6/6.6/12, of the type 6/6.6/11 and also 6/6.6/10. It is known that just these ternary copolyamides may be alcohol-soluble to a considerable extent but are insoluble in, for example, chlorinated hydrocarbons such as trichloroethylene and perchloroethylene (see, for example, Dr. S. Schaaf "Textilbeschichtung mit ternären Copolyamiden 6/6.6/12," Kunststoffberater 11, 1968, pp. 900 to 904).

The special properties of such alcohol-soluble polyamides having a controllable melting point resulted in a variety of possible uses in practice, the use of these materials in textile industry being particularly important. They are widely used in the field of textile bonding. Coating and bonding of fabrics and non-woven fabrics is effected, for example, by spraying solutions of the polyamides, by strewing powders, by applying pastes in the form of points, e.g. by screen printing or by intaglio printing. Further examples of fields of application for ternary copolyamides include the use for wire lacquers and varnishes, for finishing leather and artificial leather, for metal coating and bonding and for the production of cast film.

For technical and commercial use of such synthetic thermoplastic materials, the powder form is always of particular importance. Particularly desirable are extremely finely divided, free flowing powders which may either be applied as such very uniformly and in extremely thin layers, e.g. strewed, and which are also readily dispersed and may then be used as a paste. The art developed a great number of processes for the preparation of finely divided polymers, and the measures and steps developed on one type of polymer have always been found to be not readily applicable to other types.

As a mechanical method, especially grinding or milling of the lumpy polymer, e.g. at low temperatures, is available. However, the ground and milled products are generally relatively coarse-grained, at least as long as economically reasonable conditions are used, and often show an irregular angular and cornered condition which detrimentally affects the free flowing properties of the dry powder. It is desirable, therefore, to provide powders which are not only as finely divided as possible, i.e. have particle sizes of less than 100 microns or even less than 74 microns, but which have individual particles which are rounded off or even spherical to such a degree that free flowing properties of the dry powder are actually ensured.

Size reduction processes involving dissolution of the polymer followed by precipitation from the solution have been developed for the preparation of such ultrafine free flowing powders. For example, polyethylene may be dissolved in a solvent or in a mixture of a solvent and non-solvent and then isolated in the form of a finely divided mass by cooling and, if desired, removal of the liquid phases by distillation.

THIS INVENTION

The present invention provides a process for converting the alcohol-soluble polyamides described above and especially those ternary copolyamides which are widely used today in practice to form such free flowing ultrafine powders, especially powders which have a particle size substantially below 100 microns and preferably below 74 microns. Up to the present, no processes are available which would permit the conversion of the commercially available corresponding copolyamide types into these ultrafine powders. Tests have shown that grinding or milling does not lead to the result desired. Consequently, the invention is based on the working principle which is known per se, i.e. to dissolve the polymer in a suitable solvent or solvent mixture and then precipitate it as a finely divided material. It is then possible in accordance with the invention to convert polyamides of the class mentioned above into free flowing dry powders of ultrafine particle size.

Alcohols and alcohol-water mixtures suggested themselves from the prior art as solvents or solvent mixtures for the polyamides in question. Considerable amounts of the polyamides can be dissolved in these liquids while heating the same.

However, in an attempt to obtain a finely divided powder in conventional manner, e.g. by simple cooling and/or removal of the liquid by distillation under vacuum, it appeared that unexpected difficulties are encounterd. Even if a relatively finely divided material seems to be obtained initially, rapid coarsening and coalescence of the product occurs during the course of processing of the precipitate so that the screen analysis of the resultant products shows no or only infinitesimally small amounts of the desired finely divided product of less than 100 microns and preferably less than 74 microns even when maintaining mildest operating conditions. An economical process cannot be based on these results.

Surprisingly, the results of the process are completely changed, viz, in the direction towards the product desired, by effecting the precipitation and, if desired, the processing of the precipitated polyamide in the presence of an auxiliary material which is dissolved in the solvent. These auxiliary materials are primarily salts, this term being understood to mean salts of inorganic and/or organic acids which are soluble in the solvent or solvent mixture used. Urea may also be used in addition to, or in place of, the salts mentioned above. Even the co-use of extremely small amounts of such salts results in satisfactory precipitation of ultrafine material from the solution and it is possible without any difficulty to convert this precipitate into a dry and free-flowing powder which, when subjected to screen analysis, contains a considerable amount of particles having a size of less than 100 microns and especially less than 74 microns.

Accordingly, it is an object of the present invention to provide a process for finely dividing alcohol-soluble polyamides and especially recovering the same as dry and free-flowing powders by dissolution of the polymer in a solvent at an elevated temperature; precipitating in finely divided form; separating the precipitate and, if desired, drying it, the process comprising using as the solvent a homogeneous mixture of $C_1$ to $C_5$ alcohols and water having salts dissolved therein. Suitable salts are especially soluble metal and/or ammonium salts of inorganic and/or organic acids. Particularly suitable salts are alkali metal salts, alkaline earth metal salts and/or ammonium salts of strong inorganic acids and corresponding salts of nonovalent and/or polyvalent organic acids having a restricted number of carbon atoms, e.g. up to 7 carbon atoms and preferably up to 5 carbon atoms. The most important salts of inorganic acids are the phosphates, sulfates and/or chlorides. With the scope of the invention, particular importance is to be attributed to the phosphates. Thus, alkali metal phosphates such as sodium dihydrogen phosphate have been found to be particularly efficient auxiliary materials or aids for finely dividing the class of copolyamides described above. Typical examples of salts of lower organic acids include acetates, citrates and tartrates. All of the salts have some process-promoting effect. However, the effect desired in accordance with the invention is pronounced to a different extent. Phosphates and still the sulfates are particularly efficient aids. These are followed by organic salts such as citrates, tartrates and acetates and, finally, by chlorides. Urea may also be used as the precipitant. However, it has an effect which is lower than that of the salts mentioned above of inorganic or organic acids.

The salts are generally used in the process in limited amounts. As has been indicated above, it is necessary that they are soluble in the solvent or solvent mixture used. In general, the salts are used in an amount of not more than 10% by weight, based on the polyamide used. In practice substantially smaller amounts may be used, e.g. amounts up to 5% by weight. Satisfactory results are obtained, for example, with 2% by weight, again based on polyamide used. However, amounts of less than 1% by weight of precipitant salts give obvious effects in the sense of the invention.

The alcohol-water mixtures used to dissolve the copolyamide contain lower aliphatic alcohols having up to 5 carbon atoms such as methanol, ethanol, n-propanol, isopropanol, n-butanol, etc. The dissolving power of the alcohol increases normally as the carbon number increases. Nevertheless, an ethanol-water mixture has been found to be a particularly suitable solvent. For the process which will be described hereafter in detail, ethanol has a great number of advantages so that the use of ethanol-water mixtures is preferred. The preferred relative proportions, especially for water-ethanol mixtures, range between 60% by volume of alcohol per 40% by volume of water and 85% by volume of alcohol per 15% by volume of water. In general, filtrability of the precipitated product is the better the more water is present in the solvent mixture. On the other hand, the dissolving power of the liquid phase becomes lower thereby. Therefore, relative proportions of 70 to 80% by volume of alcohol and 30 to 20% by volume of water are to be regarded as particularly suitable.

The ratio of solvent mixture to copolyamide is dependent upon the particular conditions, i.e. especially on the selection of the alcohol and the relative proportions of alcohol and water. Generally, 5 to 9 liters, preferably 6 to 7 liters of solvent mixture will have to be used per kg. of polyamide when using ethanol-water mixtures.

Specifically, the process according to the invention comprises the following steps:

First of all, the polyamide is dissolved in the alcohol-water solvent mixture. The precipitant used in the form of salt may be present already when effecting this dissolution. Actually, it is preferred when operating continuously to use as the solvent the homogeneous mixture of alcohol, water, and salt. Dissolution is then effected by heating, e.g. by refluxing. It is also possible, however, to add the salt after the polyamide has been dissolved. As another alternative, the polyamide may first be dissolved in the alcohol whereupon water and salt are added.

The polyamide is precipitated from its solution by cooling, it being possible by external cooling to reduce the temperature of the mass to the level desired. However, it may be preferred to decrease the temperature of the mass by "internal" cooling, i.e. by keeping the reaction mixture boiling by applying an increasingly higher vacuum while simultaneously discontinuing external heating or heating externally only to an extent such that no undesirable heating of the precipitate takes place. The solvent may be withdrawn as a vapor phase. It may be desirable to withdraw not all of the solvent from the precipitate by distillation. It has rather been found preferable when processing the precipitate to separate the solids phase from the liquid phase by filtration. Depending upon the particular copolyamide type, several additional steps may be taken which are selected in each case with the objective to achieve as complete a precipitation of the dissolved polyamide as is possible and simultaneously as high a percentage of finely divided material as is possible. For example, precipitation of the finely divided material by the preferred internal cooling may initially be followed by distillation which is continued until satisfactory precipitation even of the last and, for example, low molecular weight polyamide portions has occurred. Optionally or together herewith, a non-solvent for the polyamide which is miscible with the liquid mixture used may be added for increased precipitation of the last polyamide portions. For example, the water content of the liquid phase may be simply increased by adding suitable amounts of water thereby reducing the solubility of the residual polyamide portions correspondingly. As a rule, the resultant dispersions of the precipitated finely divided polyamide may be filtered and the filtrate subjected to after-drying. However, if desired, distillation under vacuum may be effected at low temperatures to the point where substantial amounts of distillate pass no longer over. However, the product obtained in this manner still has a considerable content of moisture so that it requires final drying.

To precipitate the polyamide and to process the precipitate, it is desirable to use temperatures below 25° C. and preferably below 20° C. Final drying of the primarily obtained moist product to form the dry free-flowing powder is also preferably effected at temperatures below the levels mentioned above.

When effecting the separation of phases with insertion of a filtration step, the additional advantage is realized in the process according to the invention that a considerable portion or even the bulk of the salt used as precipitation aid is separated from the polyamide.

When operating without a filtration step or if it is desirable to remove even the last traces of salt from the precipitate, a washing step which is effected especially with water may be included.

Final drying of the precipitate is effected in a suitable manner, e.g. by storage on hurdles or in driers wherein the material is contacted with a stream of a drying gas. It has been found to be advantageous that the action of mechanical forces on the solid product is minimized during the processing of the precipitate until a substantially dry polyamide powder has been obtained. The still moist powder tends to re-agglomerate and to form undesirable enlarged particles. When preventing such phenomena, a well dispersable polyamide powder having a considerable portion of particles of less than 150 microns in size is obtained, by far the predominant portion of the particles having sizes of less than 100 microns and also less than 74 microns. The bulk of this material may comprise particles having sizes between 5 and 60 microns.

Example 1

30 grams of ternary polyamide of the type 6/6.6/12, 240 ml. of a mixture of 80% by volume of ethanol and 20% by volume of water and 5% by weight of the precipitant salt, based on the amount of the ternary polyamide, were placed into a 1 liter three-necked flask which was equipped with a thermometer, reflux condenser and stirrer. The mixture was dissolved at a temperature of the oil bath between 95 and 105° C. while stirring. After about 45 minutes, a clear solution is obtained. The reflux condenser is then replaced by a Claisen bridge whereupon part of the solvent mixture is distilled from the solution under an increasingly high vacuum and without further supply of heat. Within about 10 minutes, the temperature of the mass in the flask drops to about 15 to 20° C. and the dissolved polyamide is precipitated as a finely disperse phase. The dispersion formed is now either filtered or initially further distilled under vacuum with moderate external heating. If desired, distillation may be continued until no more distillate passes over. The separated precipitated product which, in case of the latter method, i.e. after having distilled off the liquid mixture to the greatest extent possible, has a residual moisture content of about 30% is subjected to final drying in a vacuum oven or a rotary shelf dryer. A powder having a considerable content of particles smaller than 90 microns is obtained. The content of powder consisting of particles smaller than 74 microns constitutes about 40 to 55% by weight of the total material.

In the general procedure described above, the following precipitating aids are used in successive tests: urea, 1.15 g.; sodium dihydrogen phosphate, 1.15 g.; potassium sulfate, 1.3 g.; magnesium sulfate, 1.3 g.; Sodium citrate, 1.2 g.; potassium nitrate, 1 g.; potassium thiocyanate, 1 g.; sodium acetate, 1.2 g. Further experiments were carried out with corresponding amounts of sodium chloride and sodium carbonate.

Example 2

In a commercial unit, a mixture of 300 kgs. of a ternary copolyamide of the type 6/6.6/12, 2100 liters of 80% aqueous ethanol and 14 kgs. of sodium dihydrogen phosphate is prepared. When stirring at a heating steam temperature of about 90° C., a clear solution is obtained within 2 hours. Then part of the solvent mixture is distilled off under a slowly increasing vacuum with discontinued supply of heat. In doing so, the temperature drops to about 35° C. The solution passes over into a dispersion of the precipitated finely divided polyamide. Thereafter, further solvent mixture is withdrawn under vacuum while heating for several hours. The resultant powder which appears to be relatively dry is dried in a drying oven at low temperatures and under vacuum to form a product having a residual moisture content of less than 1%. There is obtained a free flowing polyamide powder, the major part of which has a particle size of less than 74 microns.

Example 3

35 grams of a ternary copolyamide of the type 6/6.6/12 are dissolved in 350 ml. of boiling ethanol. A solution of 5 g. of sodium acetate in 90 ml. of water is prepared and heated to 80° C. Then the salt solution is added to the hot polyamide solution. The mixture becomes slightly turbid but no true precipitation of the polymer occurs. The mixture is again heated to boiling. Thereafter solvent is distilled off without external supply of heat under an increasing vacuum. In doing so, the dissolved polyamide precipitates. After an internal temperature of 35° C. has been reached, the temperature is carefully increased to 85° C. by means of a water bath and distillation is continued until a pulverulent material is obtained.

Sieve analysis of the examined material shows that 82% by weight of the particles are smaller than 74 microns with the remainder of the particles being greater than 74 microns.

When following substantially the same procedure except that the sodium acetate is replaced by 5 grams of sodium chloride as the precipitant salt, a fine powder is also obtained. However, the particles of this powder are somewhat coarser than those of the material prepared with the use of sodium acetate. When using sodium chloride, the portion of material has a particle size of less than 74 microns and is 38% by weight.

The procedure described above is repeated again except that sodium sulfate in an amount of 5 g. is used in place of sodium acetate. Here again, there is obtained a fine powder which shows the following particle size distribution when subjected to sieve analysis: 41% by weight smaller than 74 microns; 42% by weight 74 to 150 microns; 17% greater than 150 microns.

Example 4

2 kilograms of a ternary polyamide of the type 6/6.6/11 are dissolved in a mixture of 12.3 liters of ethanol (96%) and 3.1 liters of water. To the solution are added 50 grams of sodium acetate. The solution is distilled under an increasing vacuum without external supply of heat. In doing so, a temperature of the mass of less than 20° C. establishes itself. A powder having a residual moisture content of 44% is withdrawn and subjected to final drying at room temperature. The sieve analysis which is subsequently effected shows that 44% by weight of the material have a particle size of less than 74 microns.

A substantially identical result is obtained by dissolving a ternary polyamide of the type 6/6.6/10 in a corresponding ethanol-water mixture with the addition of 77 g. of sodium acetate and distilling off the solvent. The sieve analysis of the dry powder shows that about 43% by weight of the particles have a size of less than 74 microns.

What is claimed is:

1. A process for preparing finely divided alcohol-soluble linear aliphatic terpolycarbonamides melting between about 100° C. and 200° C. and recovering same as dry free flowing powders which comprises dissolving the polymer in a solvent at an elevated temperature; precipitating the polymer in finely divided form; separating the precipitate and drying same, wherein the solvent is a homogeneous mixture of a $C_1$–$C_5$ alcohol and water having dissolved therein a small amount of a member selected from the group consisting of salts and urea said member remaining dissolved in said solvent during separation of the precipitate.

2. The process of claim 1 wherein use is made of an alcohol-water mixture which contains a salt of an inorganic acid.

3. The process of claim 1 wherein use is made of an alcohol-water mixture which contains a salt of an organic acid.

4. The process of claim 1 wherein said amount is about 10% by weight, based on copolyamide charged.

5. The process of claim 1 wherein said amount is about 5% by weight, based on copolyamide charged.

6. The process of claim 2 wherein said salt of an inorganic acid is a member selected from soluble alkali metal, alkaline earth metal and ammonium salts of strong inorganic acids.

7. The process of claim 6 wherein said salt is a member selected from the group consisting of phosphates, sulfates and chlorides of strong inorganic acids.

8. The process of claim 3 wherein said salt of an organic acid is a member selected from the group consisting of soluble alkali metal, alkaline earth metal and ammonium salts of organic acids having up to 7 carbon atoms.

9. The process of claim 8 wherein said acid contains up to 5 carbon atoms.

10. The process of claim 8 wherein said salt is a member selected from the group consisting of acetates, citrates and tartrates.

11. The process of claim 1 wherein the alcohol-water mixture contains from 60 to 85 parts by volume of alcohol and from 40 to 15 parts by volume of water.

12. The process of claim 1 wherein said alcohol-water mixture is an ethanol-water mixture.

13. The process of claim 1, which comprises dissolving said copolyamide at an elevated temperature; cooling the solution to temperatures below 25° C. while evaporating part of the solvent; recovering the precipitate and subjecting it to final drying, and avoiding compressive, frictional or shear forces during processing of the precipitate to form the dry powder.

14. The process of claim 13 wherein the precipitated and filtered material is washed with water to remove residual salt.

15. The process of claim 1 wherein from 5 to 9 liters of solvent mixture are used per kilogram of copolyamide.

16. The process of claim 1 wherein said copolyamide is a ternary copolyamide selected from the group consisting of a copolyamide of caprolactam and hexamethylenediammonium adipate plus a lactam of an $\omega$-amino carboxylic acid selected from the group consisting of $\omega$-amino-decanoic, $\omega$-amino-undecanoic and $\omega$-amino-dodecanoic acid.

References Cited

UNITED STATES PATENTS

| | | | |
|---|---|---|---|
| 3,334,070 | 8/1967 | Chezaud | 260—78 S |
| 2,742,440 | 4/1956 | Stott et al. | 260—78 S |

HAROLD D. ANDERSON, Primary Examiner

U.S. Cl. X.R.

260—78 A, 78 L, 96 R